(Model.)

W. H. MAXWELL.
MANUFACTURE OF GLASS PAPER WEIGHTS.

No. 263,931. Patented Sept. 5, 1882.

WITNESSES:

INVENTOR:
W. H. Maxwell
BY
ATTORNEYS.

UNITED STATES PATENT OFFICE.

WILLIAM H. MAXWELL, OF ROCHESTER, PENNSYLVANIA, ASSIGNOR TO BROWN, MAXWELL & COMPANY, (LIMITED,) OF SAME PLACE.

MANUFACTURE OF GLASS PAPER-WEIGHTS.

SPECIFICATION forming part of Letters Patent No. 263,931, dated September 5, 1882.

Application filed June 15, 1882. (Model.)

*To all whom it may concern:*

Be it known that I, WILLIAM H. MAXWELL, of Rochester, in the county of Beaver and State of Pennsylvania, have invented a new and useful Improvement in the Manufacture of Glass Paper-Weights and other Articles from Glass, of which the following is a full, clear, and exact description.

Figures 1, 2:
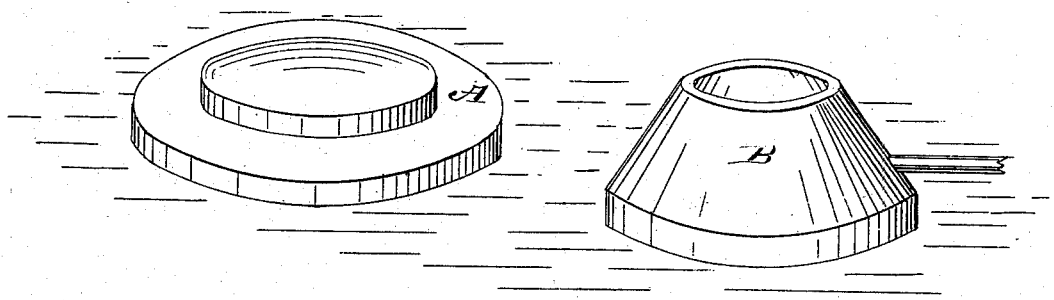
Figure 3:
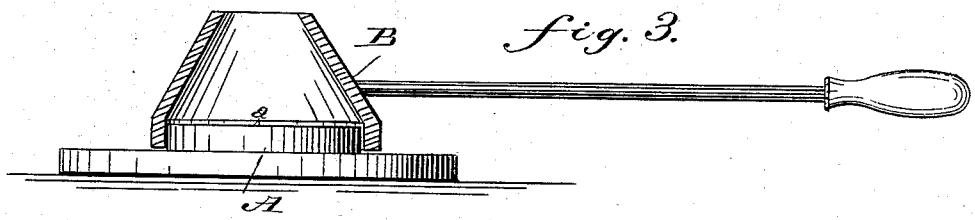
Figure 4:
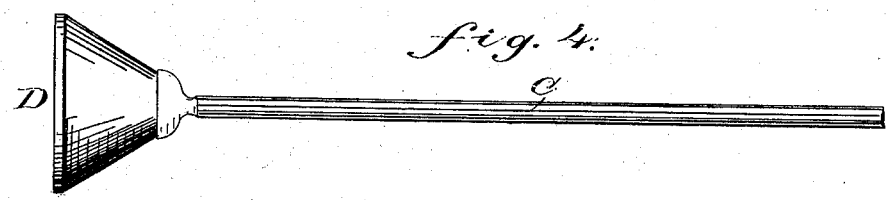
Figure 5:

Figure 1 is a perspective view of the mold. Fig. 2 is a perspective view of the ring for surrounding the mold and into which the molten glass is poured. Fig. 3 is a side elevation, partly in section, of the mold, ring, and plate in position. Figs. 4 and 5 are side elevations of the punty carrying the molded glass.

My invention consists in a new process for the manufacture of paper-weights and other articles from glass, and containing names, designs, or pictures in colors.

The essential feature consists in the covering of paintings or designs made in vitrifiable colors with molten glass, as hereinafter described and claimed, reference being had to the accompanying drawings, wherein I have illustrated the apparatus used in carrying out the process.

The process is as follows: Upon a thin plate, *a*, of white glass, or glass of any color, and of a circular or other shape, are first painted or printed names, monograms, or designs of any kind, as may be desired, and in vitrifiable colors. This plate is then placed in a mold, A, (shown in Fig. 1 of the drawings,) which mold is made with a concave or flat surface, according to the form it is desired to give to the painted plate, and the mold and glass plate are then placed in the fire until the glass is sufficiently heated. The ring B (shown in Fig. 2) is then placed over the plate *a* and around the mold, as shown in Fig. 3, and into this ring glass in a molten state is dropped, so that it covers the back and one side of the painted plate. The glass thus molded is then removed and "struck up" on a "punty" or pipe, as illustrated in Fig. 4, and the other side of the painted plate is then covered, either by "casting on" the glass or "gathering it" on in the pot. I then cut down behind the plate with ordinary glass-working tools until it is small enough to be knocked off, as in Fig. 5.

By this process I produce an article of handsome appearance.

I do not limit myself to any particular shape, form, or size, nor especially to the manufacture of paper-weights, as door-knobs, curtain-pins, door-plates, and other articles can be made by the same process.

One or both sides of the painted glass plate may be covered with clear glass, as desired.

Having thus described my invention, I claim as new and desire to secure by Letters Patent—

1. Improved process for the manufacture of paper-weights and other articles, which consists in covering vitrified paintings or designs upon glass with molten glass by casting or molding, substantially as described.

2. The hereinbefore-described process for the manufacture of paper-weights and other articles, which consists in first painting or printing a design upon colored glass with vitrifiable colors, and then covering the same with clear glass by molding or casting, substantially as described.

3. In the manufacture of paper-weights and other articles from glass, the combination of the mold A, for receiving the painted or printed plate of glass, and the ring B, adapted to be placed over the plate *a* of glass, and the mold for casting clear glass thereon, substantially as shown and described.

WILLIAM H. MAXWELL.

Witnesses:
HARTFORD P. BROWN,
GEORGE H. CROSS.